United States Patent
Aslanidis et al.

(10) Patent No.: US 6,690,259 B2
(45) Date of Patent: Feb. 10, 2004

(54) SECURITY SYSTEM TO ENABLE AUTHENTICATED ACCESS OF AN INDIVIDUAL TO A PROTECTED AREA

(75) Inventors: Konstantin Aslanidis, Dachau (DE); Andreas Hagl, Dachau (DE)

(73) Assignee: Texas Instruments Incorporated, Dallas, TX (US)

( * ) Notice: Subject to any disclaimer, the term of this patent is extended or adjusted under 35 U.S.C. 154(b) by 400 days.

(21) Appl. No.: 09/808,527

(22) Filed: Mar. 14, 2001

(65) Prior Publication Data
US 2002/0130763 A1 Sep. 19, 2002

(30) Foreign Application Priority Data
Mar. 15, 2000 (DE) .......................... 100 12 637

(51) Int. Cl.[7] ............................................. G05B 19/00
(52) U.S. Cl. ................... 340/5.61; 340/5.71; 340/5.62; 340/505; 340/10.2; 340/10.34; 340/870.19; 455/336; 455/343.1; 455/343.2; 455/343.5; 320/166
(58) Field of Search ............................. 340/5.61, 5.71, 340/10.34, 505, 870.19, 10.2, 5.62; 455/336, 343.1, 343.2, 343.5; 320/166

(56) References Cited

U.S. PATENT DOCUMENTS 5,541,585 A * 7/1996 Duhame et al. ........... 340/5.62
6,034,603 A * 3/2000 Steeves ..................... 340/10.2

* cited by examiner

Primary Examiner—Michael Horabik
Assistant Examiner—Yves DaLencourt
(74) Attorney, Agent, or Firm—Bret J. Petersen; W. James Brady, III; Frederick J. Telecky, Jr.

(57) ABSTRACT

A security system to enable authenticated access of an individual to a protected area, including a remote control unit (22) with a transponder (28), carried by the individual, which transmits an identification code group on reception of an interrogation signal. A control unit located within the protected area transmits an interrogation signal when activated by the individual, and verifies the identification code group received from the transponder. Access to the protected area will only be permitted on positive verification of the right to access. The transponder (28), contained within the remote control unit (22), is a passive transponder which obtains a supply voltage from the interrogation signal transmitted by the control unit (16) and then feeds this to a supply voltage rail. The remote control unit (22) contains a battery (34) that can be connected to the supply voltage rail (46) by means of a controllable battery coupling switch (42)via a high-resistance path when the remote control unit (22) is in its quiescent state, or via a low-resistance path when the remote control (22) unit is in its active state.

11 Claims, 3 Drawing Sheets

SECURITY SYSTEM TO ENABLE AUTHENTICATED ACCESS OF AN INDIVIDUAL TO A PROTECTED AREA

BACKGROUND OF THE INVENTION

The invention relates to a security system that will enable authenticated access of an individual to a protected area by means of a remote control unit, carried by the individual, containing a transponder that on reception of an interrogation signal transmits an identification code group, and a control unit, located within the protected area which, when activated by the individual, transmits the interrogation signal and then checks the identification code group sent by the transponder and allows access for the individual to the protected area only after positive verification of the authorisation to access.

It is becoming more and more usual that an individual should want to obtain access to a protected area, such as to a vehicle protected by a locked door or to a locked garage, by means of a remote control. For the purpose of the following explanation it is assumed that the protected area implies a vehicle, but the explanation should also be taken as generally valid for any protected area to which access should only be made available to an authorised individual.

The remote control used to provide access is, in the case of a vehicle representing the protected area, preferably integrated in the actual vehicle key and will be activated by pressing a button at the vehicle. The activated remote control then transmits a signal containing an identification code group unambiguously allocated to the vehicle key. This signal is received and decoded by a receiver in the vehicle and, provided that the code group contained in the signal coincides with a corresponding code group in a control unit connected to the receiver, the vehicle door locks are released, so that the vehicle will be open and access to the interior of the vehicle will become possible.

Depending on the transmitter power available, the vehicle may be opened from a greater or lesser distance of the vehicle by means of the remote control. The energy required will be provided by a battery which is housed within the vehicle key. A great problem with this mode of enabling authenticated access to the vehicle consists in that it will no longer be possible to open the vehicle by remote control when the battery in the vehicle key can no longer supply sufficient energy to power the remote control. The individual operating the key will then be forced to resort to other measures to open the vehicle, for example by unlocking the vehicle mechanically by means of a key in the conventional way. This, however, has the great disadvantage that, when this possibility is provided, the security aspect is lost, which means that even unauthorised individuals will be able to open the vehicle by simply unlocking it with a key.

A further development of enabling authenticated access to a vehicle is a so-called passive unlocking system, where the individual is no longer actively required to activate the remote control signal. With this passive unlocking system it is sufficient for the individual to be at a relatively short distance from the vehicle, whereby the interchange of transmitted signals between the remote control unit, carried by the individual, and the vehicle to be unlocked is initiated, for example, by the individual touching the door handle as if to open the door manually. The "remote control", carried by the individual may be housed, for example, within the vehicle key or even in a so-called chip-card. In such a case, the opening procedure starts with the individual touching the vehicle door handle, whereupon a control unit within the vehicle transmits an interrogation signal which, on reception, initiates in the remote control unit the re-transmission of the identification code group used for authentication. After checking that this code group coincides with the code group stored in the vehicle, unlocking of the door locks takes place and the vehicle may be opened by the corresponding activation of an electrical unlocking mechanism. Since, in the case described, there is a relatively great distance between the vehicle and the remote control unit, for example one meter, the remote control unit must contain its own power supply in the form of a battery. This again gives rise to the unfavourable situation that authenticated access to the vehicle can no longer be guaranteed when the battery is low or inactive.

The invention, therefore, rests on the requirement to modify a security system of the type described above in such a way that, at an optimised low current consumption, the authenticated access of an individual to a protected area is made possible, even when the power supply of the remote control unit has gone low or is inactive.

According to the invention, this requirement is met in that the transponder contained in the remote control unit is a passive transponder which obtains its supply voltage from the interrogation signal sent out by the control unit and applies it to a supply voltage rail, that the remote control unit contains a battery that can be connected to the supply voltage rail by means of a controllable battery coupling switch via a high-resistance path when the remote control unit is in its quiescent state, or via a low-resistance path when the remote control unit is in its active state, that a pulse detector is provided which receives its supply voltage in the quiescent state of the remote control unit via the high-resistance path of the battery coupling switch and which, on reception of the interrogation signal by the transponder, outputs a recognition signal, that a remote-field detector is provided which receives the recognition signal and outputs a remote-field signal as soon as the value of the recognition signal comes within a pre-determined range, that a logic circuit is provided which, on reception of the remote-field signal, outputs a switching signal to the battery coupling switch which switches this into the state where the battery is connected to the supply voltage rail via the low-resistance path, and outputs an activation signal to the transponder which will cause its transmitting unit to transmit the identification code group, and that a near-field detector is provided which, on recognising a value of the supply voltage produced by the transponder exceeding a pre-determined threshold value, outputs a near-field signal that causes the logic circuit to put the battery coupling switch into the state prevailing in the quiescent state of the remote control unit, and to transmit the activation signal to the transponder.

SUMMARY OF THE INVENTION

The transponder used in the security system according to the invention can, without the need of an energy supply from a storage battery, receive and decode a signal sent by the control unit in the protected area. This may be a transponder of the type known from EP 0 301 127 B1. But to achieve a wider range of the remote control unit, a supply battery has been provided which, however, in the quiescent state of the remote control unit only delivers as much current to the circuits contained in the remote control unit as to enable it to recognise an interrogation signal sent by the control unit in the protected area, so that, as a result of this recognition process, the remainder of the circuit is brought into an active mode. The result of this activation process is that the supply battery can supply a higher current to the circuits contained in the remote control unit and consequently to enable the interrogation signal to be decoded and to transmit the identification code group at a higher transmission power. Should the individual with the remote control unit be in such close proximity to the control unit of the protected area that the near-field detector detects a high signal level and transmits the near-field signal, the battery is, once again, left almost entirely disconnected from the circuit, so that a saving in current consumption is obtained, enabling the transponder to receive and to decode the interrogation signal without making demands on the battery. The transponder can also transmit the identification code group without the supply battery having to deliver any power. The same applies when the supply battery is completely inactive, whereby in this case access authentication can be achieved when the remote control unit is moved into a very close position to the control unit of the protected area, to enable the transponder to obtain its supply voltage from the interrogation signal and the identification code group to be sent at low transmission power.

The protected area is preferentially a vehicle whose door will only be unlocked by the control unit housed in this vehicle when the identification code group sent back by the transponder corresponds to the code group expected by the control unit. In an advantageous embodiment, the control unit housed in the vehicle transmits the interrogation signal when the individual either touches or actuates the door handle of the vehicle.

It is advantageous to incorporate an aerial, forming part of the vehicle control unit, in the wing mirror on the driver's side.

BRIEF DESCRIPTION OF THE DRAWINGS

The invention shall now be explained, in exemplified form, with the help of the diagrams, in which

In FIG. 1 a protected area 10 is shown schematically, which can be accessed through a door 12. The door 12 is secured by means of a lock 14, which can be unlocked by a control unit 16. An activator 18, assigned to the door 12, serves to activate the control unit 16, as shall be explained later on. An aerial 20 is connected to the control unit and serves to transmit a signal generated by the control unit 16. The aerial 20 can also receive a signal transmitted by a remote control unit 22, via an aerial 24, also shown schematically in FIG. 1.

Figure 1:
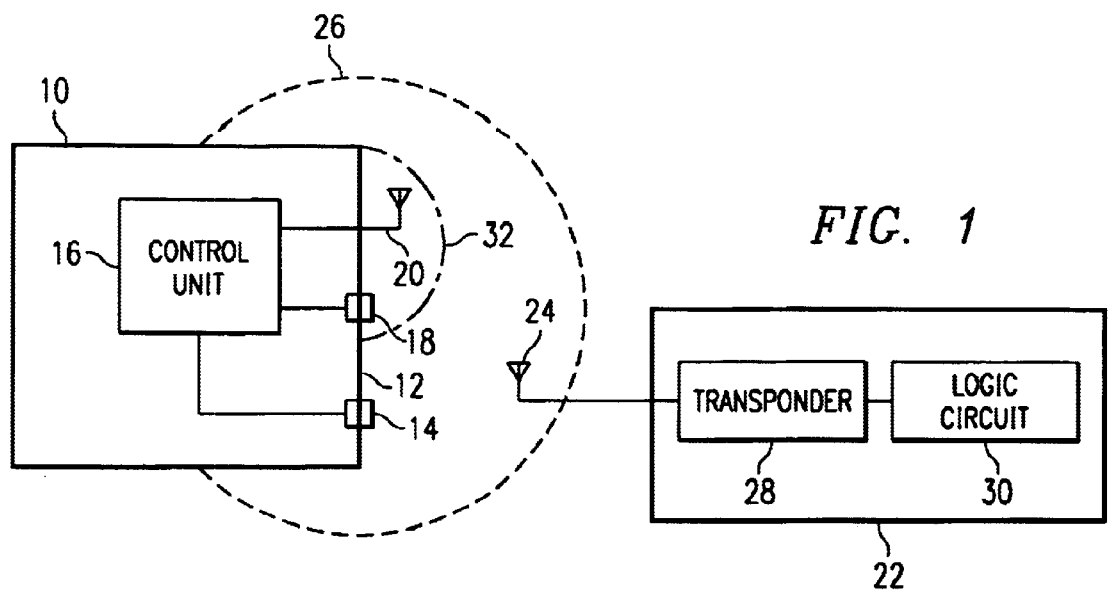
FIG. 1 is a schematic representation for the purpose of explaining the security system according to the invention.

The large circular arc 26 shown in FIG. 1, schematically indicates the area within which the aerial 24 of the remote control unit 22 must be situated to enable remote control communication between the remote control unit 22 and the control unit 16 within the protected area 10. The remote control unit 22 contains a transponder 28 which can receive and transmit signals by way of the aerial 24, as well as a logic circuit 30 to handle signal processing in the remote control unit 22.

To enable the global functional operation of the security system here to be described to be explained clearly, it is assumed that, as a concrete application example, the protected area 10 is a motor vehicle which is accessible through a door 12 that can be locked and unlocked by means of the lock 14. The triggering device 18 is the door handle and the aerial 20 is located in an area near the door handle, preferentially in the wing mirror on the side of the driver. The remote control unit 22 is housed inside the vehicle key, which also contains a battery that under normal conditions of use provides the necessary energy supply for the desired remote control unit reception range of approximately 1.5 m.

When the individual in possession of the vehicle key wants to open the door 12, it will be necessary for the individual to approach the vehicle so as to be able to touch the door handle 18 and to move it in a sense as if to open the vehicle. It is then certain that the vehicle key is within the area surrounded by the circular arc 26, that is within range of the remote control 20. Movement of the door handle 18 causes the control unit 16 to transmit an interrogation signal via the aerial 20, which will be received by the aerial 24. The interrogation signal contains a specific pulse sequence which enables the transponder 28, in conjunction with the logic circuit 30, to recognise this signal as a signal transmitted by the security system. Any other signal that may be received by chance from any other source will have no effect as far as the remote control unit 22 is concerned.

On recognition of the specific pulse sequence, the remote control unit 22 transmits an identification code group via the transponder 28 and its associated aerial 24, which is received by the aerial 20 of the control unit 16. The control unit 16 compares this identification code group with a code group stored within itself and, if these coincide, generates a switching pulse that is fed to the door lock 14, causing it to unlock. The interchange of signals, followed by the unlocking of the lock 14 as a consequence of the switching signal transmitted by the control unit, takes place in such a short time that the individual operating the door handle gains access to the vehicle virtually without delay, provided that the individual is in possession of the correct vehicle key containing the remote control unit 22. This authentication process makes sure that only an authorised individual gains access to the vehicle.

The functional sequence described presupposes that the transmitting range of the remote control unit 22 is sufficiently large to bridge a distance of up to 1.5 m between the aerial 24 and the aerial 20. This will only be possible when the battery within the remote control unit 22 is capable of supplying the necessary energy. If, however, the battery is almost exhausted or completely inactive, the aerial 24 will only transmit a very faint signal, or none at all, as a reaction to the reception of the interrogation signal transmitted by the aerial 20, so that the control unit 16 can no longer recognise the identification code group required for authenticated access through the door 12. In order to enable the authorised individual still to gain access to the vehicle, the remote control unit 22 must be taken into the immediate vicinity of the aerial 20, that is to say into an area indicated by the broken-line circular arc in FIG. 1.

As has been mentioned, the transponder 28, housed in the remote control unit, is a passive transponder which can generate the supply energy required for its operation and for the operation of the logic circuit 30 from the received interrogation signal. Because of the short distance separating both the aerials 20, 24, it is possible, on the one hand, to transfer sufficient energy by the interrogation signal to the transponder 28 to enable this to generate the required supply energy, and the identification code group, transmitted by the transponder 28 at relatively low power, can then be received by the aerial 20 and further processed as described above, so that authenticated access to the vehicle is made possible once the control unit 16 has verified that the code groups coincide.

The security system as described therefore always enables an individual authenticated access to the protected area, in this particular case to the vehicle, even when there is no longer any energy supply source available in the remote control unit 22.

Figure 2:
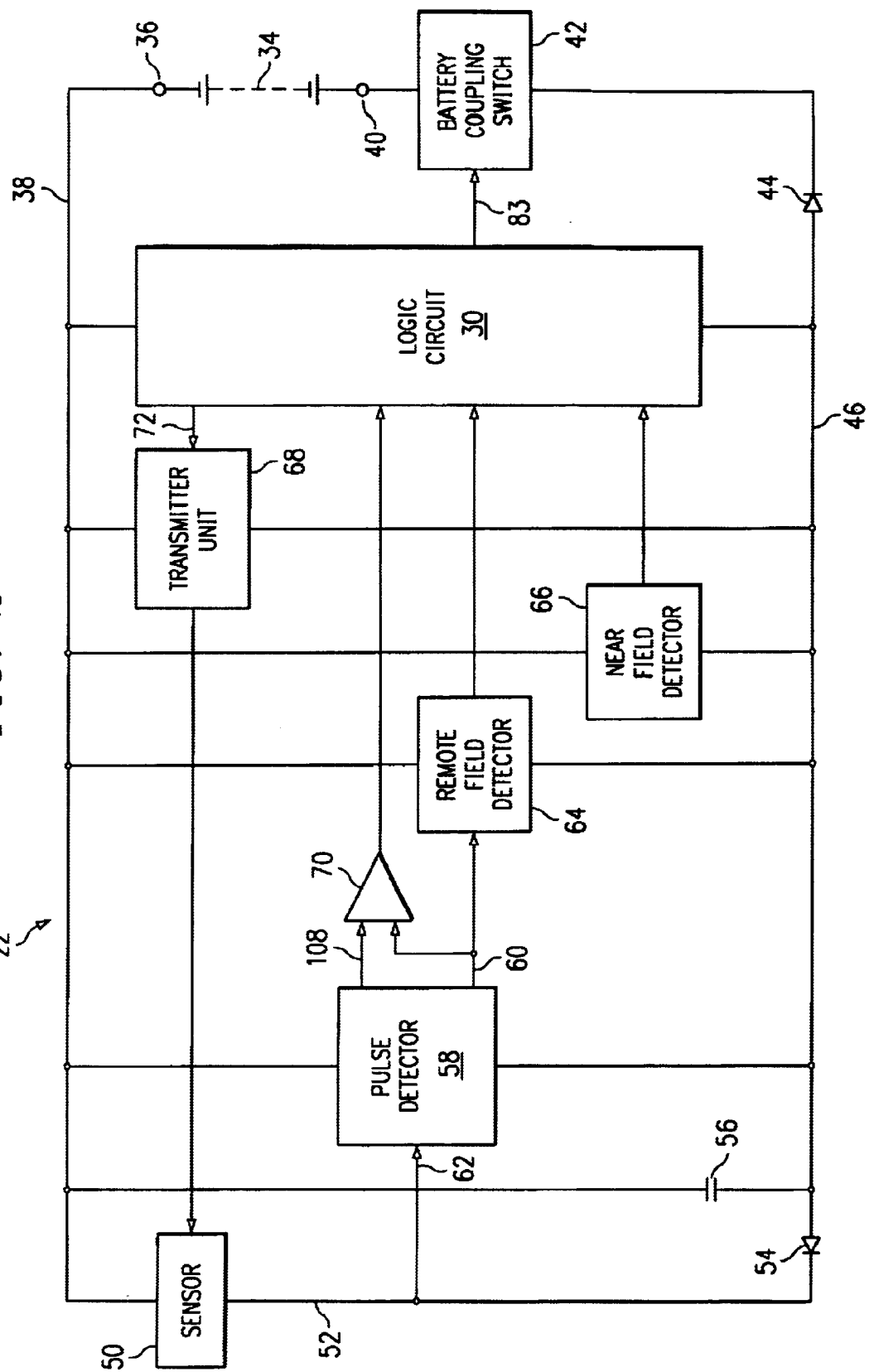
FIG. 2 is a block diagram of the security system according to the invention.

Making reference to FIG. 2, it shall be now explained in more detail which units are contained in the remote control unit 22 to enable both its active operation with an operational battery and its passive operation when the battery is either low or entirely inactive.

The remote control unit 22 represented in FIG. 2 contains a battery 34 as an energy source, which is connected to a grounded conductor 38 by way of connection 36, whilst its other connection 40 is connected to a supply voltage rail 46 by way of a battery coupling switch 42 and a diode 44. Depending on a switching signal supplied by the logic circuit 30, the connection 40 of the battery 34 can be connected to the supply voltage either via a low or high-resistance path.

The receiving element for an interrogation signal transmitted by the control unit within the protected area is a sensor 50, contained in the remote control unit, which consists of a circuit tuned to the frequency of the interrogation signal. The inductance of this tuned circuit also constitutes both the transmitting and the receiving aerial of the remote control unit 22. Whenever the sensor 50 receives an interrogation signal, it outputs an RF signal at its output 52 which can be rectified by the diode 54. This rectified voltage then causes the charging of a capacitor 56, which is connected in parallel with the sensor 50 and the diode 54. The output signal of the sensor 50 is also fed to a pulse detector 58, the purpose of which is to output a recognition signal at an output 60 as soon as an RF signal is fed to its input 62 from the sensor.

The recognition signal from the pulse detector 58 is fed to the remote-field detector 64, which outputs a remote-field signal to the logic circuit 30 whenever the recognition signal is within a pre-determined range. Connected to the logic circuit 30 is also a near-field detector 66, which feeds a near-field signal to the logic circuit 30 whenever the charge voltage of the capacitor 56 exceeds a pre-determined threshold value.

The remote control unit 22 furthermore contains a transmitter unit 68 which is activated by the logic circuit 30 and which may be made to transmit an identification code group stored within it. For the purpose of transmitting this identification code group, the coil contained in the sensor 50 is used as an aerial.

The application case to be described assumes that the battery 34 of the remote control unit 22 operates charged to its full capacity, and that an individual wants to gain access to the protected area 10, that is the vehicle in the example described, by means of the remote control unit 22. To this end, the individual, together with remote control unit 22 being carried by it, must approach the vehicle to the extent that it is positioned within the area delimited by the circular arc 26. It must furthermore touch the door handle which forms the triggering device 18. This touch contact causes the transmission of a corresponding signal to the control unit 16, which then causes the transmission of the interrogation signal by means of the aerial 20. The interrogation signal is acquired by the sensor 50, so that this, at its output 52, outputs a signal which reaches the pulse detector 58 through its input connection 62. In the quiescent state of the remote control unit, the pulse detector 58 receives a small current via the battery coupling switch 42 which is sufficient to cause the pulse detector 58, on recognition of the signal at its input 62, to output a corresponding recognition signal at its output 60. In this case, the reduced current can flow through the battery coupling switch 42, since this constitutes a relatively high-resistance connection between its connection 40 and the supply voltage rail 46.

As soon as the recognition signal at the output 60 of the pulse detector is within the pre-determined range, it is detected by the remote-field detector 64, which then outputs a remote-field signal to the logic circuit 30. In response to the remote-field signal the logic circuit 30 outputs a switching signal to the battery coupling switch 42, thus causing the establishment of a low-resistance path between the connection 40 of the battery 34 and the supply voltage rail. The circuit units contained in the remote control unit 22 are then immediately supplied with the full supply current and therefore become fully operational. The interrogation signal, which is transmitted by the control unit 16 within the protected area, is not a carrier frequency signal only, but is a pulse modulated signal, that is a carrier signal, containing no-pulse periods that correspond to the information transmitted. A differential amplifier 70, fed by a further output signal at an output 108 of the pulse detector 58 and the recognition signal, outputs a square-wave signal derived from the modulated RF signal, which is used by the logic circuit 30 to recognise whether the signal received by the sensor is, in fact, an interrogation signal originating from the control unit of a protected area, or whether it is only an RF signal from other sources.

As soon as the logic circuit 30 has established that the interrogation signal was, indeed, an interrogation signal transmitted by a control unit 16, it outputs an activation signal from its output 72 which induces the transmitter unit 68 to transmit the identification code group stored in the logic circuit, whereby the coil contained in the sensor 50 acts as a transmission aerial. Since, in the current state of the remote control unit all circuit units are supplied with the full supply current from the battery 34, transmission of the identification code group takes place at relatively high power, so that the relatively large distance present between the sensor 50 and the aerial 20 at the vehicle can be bridged without difficulty. The control unit 16 in the vehicle is therefore able to compare the identification code group with the identification code group stored in it and belonging to the vehicle, and, if both code groups coincide, will generate a signal that unlatches the lock 14, so that the door 12 can be opened.

If it is now assumed that the battery 34 is exhausted, then it can no longer provide the required supply energy for the remote control unit 22. As a consequence, the remote control unit 22 will not be able to re-transmit a signal to the control unit 16 within the vehicle, in response to any interrogation signal. It will, therefore, also be impossible to unlock the lock 14 of the door 12. The individual carrying the remote control unit 22 is, of course, aware of this and must therefore make use of a further possibility to gain authenticated access to the vehicle.

The remote control unit must be brought into the immediate proximity of the aerial 20 which, in the example described, is located in the wing mirror on the driver side of the vehicle to be opened. By touching the triggering device 18, formed by the door handle of the vehicle, the interrogation is caused to be transmitted by the control unit 16. This interrogation signal can now be received by the sensor 50, located in close proximity to the aerial 20. The remote control unit 22 will now operate in its intended passive transponder mode. This means, in the first instance, that the interrogation signal received is rectified by the diode 54, so that the rectified voltage will charge up the capacitor 56. The charging voltage at this capacitor 56 now provides the supply energy for the entire remote control unit 22. The capacitor 56, in relation to the energy supplied by the transmitted interrogation signal, is dimensioned so that the energy stored in it is sufficient to effect the transmission of the identification code group, assisted by signals from the pulse detector 58, the remote-field detector 64 and the logic circuit 30, taking into consideration the transmitter unit 68. Although transmission of this identification code group is at low power, as a result of the short distance separating the aerial 24 of the remote control unit 22 and the aerial 20 at the vehicle, it will be sufficient for the control unit 16 to verify the identification code group and, if coincidence is established, to unlock the lock 14 and enable access to the vehicle, in the same way as in the previously described case where the battery 34 was operational. In this way, it is made possible for the individual to gain authenticated access to the vehicle even if the battery is inactive.

To ensure that the energy drain from the battery 34 is kept as low as possible and to restrict it to those occasions when such an energy drain is strictly necessary, a near-field detector 66 is provided in the remote control unit 22, which fulfils the function to be described in the following. Should the remote control unit 22, with a fully-functional battery, be in the immediate vicinity of the aerial 20 at the vehicle when the individual activates the triggering device 18 constituted by the door handle of the vehicle, then, at first, the procedure will be the same as in the case above described for a fully operational battery 34. This means that the logic circuit 30, as a result of the remote-field signal received by it, outputs the switching signal to the battery coupling switch 42, so that this will go into the low-resistance path state. As a result of the short distance between the aerial 20 and the remote control unit 22, however, the sensor 50 receives such an amount of energy that the capacitor 56 can charge up to a voltage which is higher than the supply voltage provided by the battery 34. The near-field detector 66 ascertains that the charge voltage of the capacitor 56 exceeds the threshold value corresponding to the maximum supply voltage provided by the battery and outputs a near-field signal to the logic circuit 30, which causes the battery coupling switch 42 once again to abandon its low-resistance mode, leaving only the high-resistance connection path open. The energy drain from the battery 34 is therefore very much reduced in this particular case, which results in an extension of the active life of the battery.

Figure 3:
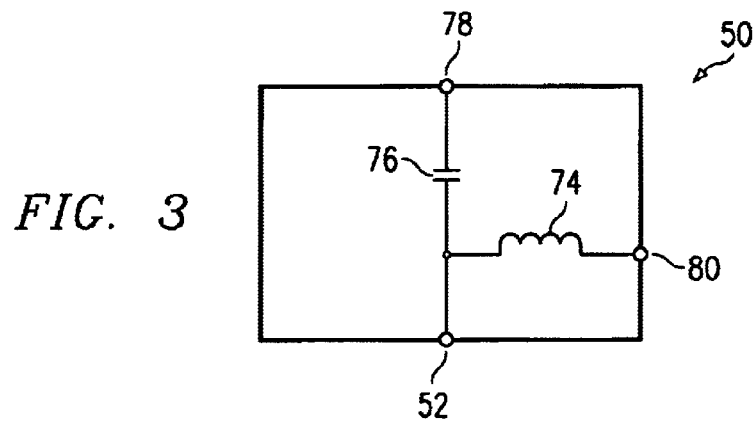
FIG. 3 represents a possible embodiment of the sensor used in the diagram of FIG. 2.

FIG. 3 represents the circuit arrangement of the sensor 50. As is apparent, the sensor contains a coil 74 which fulfils the function of the aerial 24 of the remote control unit 22. Furthermore, the sensor contains a capacitor 76 which, in conjunction with the coil 74, forms a resonant circuit tuned to the frequency of the interrogation signal transmitted by the control unit 16. Connection 78 of the sensor 80 is connected to the ground rail 38, the connection 80 is connected to the transmitter unit 68, and the connection 52 is connected to the input 62 of the pulse detector 58.

Figure 4:
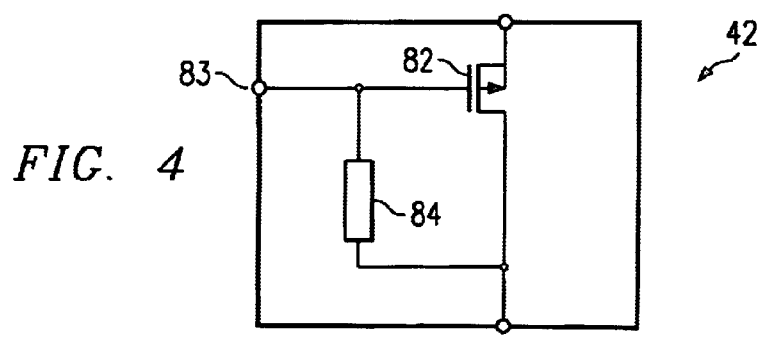
FIG. 4 represents a possible embodiment of the battery coupling switch shown in FIG. 2.

FIG. 4 represents the circuit arrangement of the battery coupling switch 42. It contains a MOS field-effect transistor 82 whose source-drain path establishes a connection from the battery connection 40 to the diode 44. It furthermore contains a resistor 84 which is connected between the gate and the drain connections of the MOS field-effect transistor 82. In the normal quiescent state of the circuit, the MOS field-effect transistor 82 is in a high-resistance state, where only a small current can flow through its source-drain path. If, however, the logic circuit 30 sends a switching signal to the connection 83 of the battery coupling switch 42, the MOS field-effect transistor 82 will be put into its conducting state, so that a low-resistance path is made available between the battery connection 40 and, via the diode 44, the supply voltage rail 46. This state only obtains when the pulse detector 58 has detected the reception of an interrogation signal by the sensor 50, and the remote-field detector 64 supplies the remote-field signal to the logic circuit 30 and, furthermore, the near-field detector 66 has not registered a voltage at the capacitor 56 that exceeds the battery supply voltage.

An important component of the device here to be described is the pulse detector 58. This pulse detector 58 must be equipped in such a way as to be in a position, even in the quiescent standby mode of the remote control unit 22, that is in a state when current consumption is very low or even where the battery has become inactive, to react to an interrogation signal received by the sensor and, if applicable, generate a recognition signal at the output 60.

Figure 5:
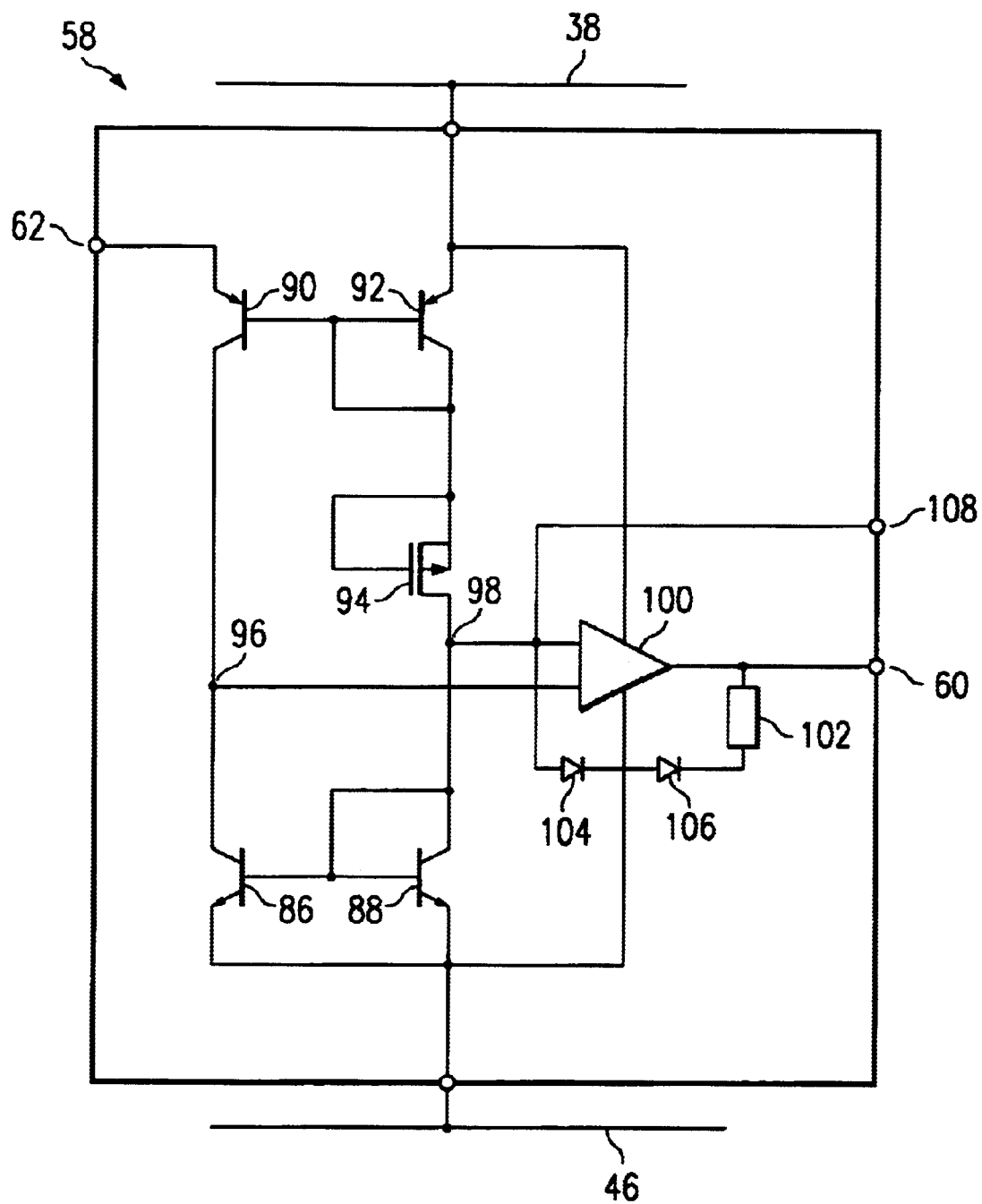
FIG. 5 represents a possible embodiment of a pulse detector shown in FIG. 2.

FIG. 5 illustrates a possible embodiment of this pulse detector 58.

The pulse detector 58 comprises two current mirrors, each consisting of two bipolar transistors 86, 88 and 90, 92 respectively. These current mirrors are interconnected in such a way as to form together an amplifier. The emitter of the transistor 90 forms the input 62 connected to the sensor, whilst the emitter of the transistor 92 is connected to the ground rail 38. The interconnected emitters of the transistors 86 and 88 are connected to the supply rail. The collectors of the transistors 86 and 90 are connected to each other, whilst the interconnection between the collectors of transistors 88 and 92 is via a MOS field-effect transistor 94, which could also be replaced by a resistor and merely behaves like a current source. The output signals of the amplifier formed by the two current mirrors are taken from the circuit points 96 and 98 and fed to a differential amplifier 100. The negative feedback provided at the differential amplifier 100 by two diodes in series with a resistor 102 serves to limit the dynamic range. The pulse detector 58 outputs the recognition signal at its output 60, and a reference signal for the amplifier 70 at a further output 108.

For the purpose of describing the mode of operation of the pulse detector 58, it shall initially be assumed that the battery 34 is capable of supplying the full supply voltage and that the remote control unit 22 is in a quiescent state, in that the field-effect transistor 82 in the battery coupling switch 42 is in the off-state. Only a very low voltage therefore exists between the ground rail 38 and the supply rail 46. To ensure that even in this state a defined signal is available at the output 60 of the pulse detector 58, the base-emitter area of the transistor 86 is made larger than that of the transistor 88, with the consequence that a lower voltage obtains at the collector of the transistor 86 than at the collector of transistor 88. This ensures that even at very low currents a defined voltage difference between the circuit points 96 and 98 exists, which is then processed by the differential amplifier 100, so that a signal of a high value appears at the output 60. The remote-field detector 64 reacts to this signal by not outputting a remote-field signal. When, however, the sensor 50 receives an interrogation signal, a radio frequency signal reaches input 62 of the pulse detector 58 which, via the transistor 90 and in the present state of the pulse detector 58, causes the voltage at the circuit point 96 to rise so as to exceed the voltage at the circuit point 98. The voltage difference between the circuit points 96 and 98 thereby becomes virtually inverted, so that a signal of low value is produced at the output of the differential amplifier 100. This signal causes the remote-field detector 64 to output a remote-field signal to the logic circuit 30. As has already been explained in detail in the above, the consequence of this is that the transistor 82 in the battery coupling switch 42 is put into the conducting state, so that now the full supply voltage is able to reach the supply voltage rail 46. This means that all the units comprising the remote control unit 22 are supplied with the energy required by them. The differential amplifier 70 receives at one of its inputs the recognition signal from the output 60 of the pulse detector 58, and at the other input the voltage present at the output 108 of the pulse detector, which is used as a reference voltage. The reference voltage at output 108 is a reference voltage which changes dynamically with the available supply voltage, and which is always kept in the correct relation to the voltage at output 60. Since, as has already been explained in the foregoing, the interrogation signal is not a continuous radio frequency signal, but rather a keyed signal composed of RF pulses and nopulse periods, the differential amplifier 70 will output at its output either a high or a low level signal, depending on whether the RF pulse is present or not. From the sequence of high and low level signals, the logic circuit 30 can ascertain whether the interrogation signal is, in fact, a signal transmitted for the benefit of the remote control unit 22, or whether it is an RF signal emanating from some other source.

Since the signal fed to the input 62 of the pulse detector is subject to large dynamic range variations, depending on the distance between the aerial 24 and the aerial 20, dynamic limiting is achieved by the negative feedback at the differential amplifier 100 by way of the resistor 102 and the diodes 104 and 106, which prevents overdriving the circuit even at high signal reception levels.

Should the battery 34 have become inactive and is unable to deliver a supply voltage, no supply voltage is applied to the pulse detector 58 when the remote control unit 22 is in its quiescent state Only on reception of an interrogation signal by the sensor 50, a charging voltage is built up at the capacitor 56 by rectifying the interrogation signal, which then supplies the necessary operating energy for the pulse detector 58. Because of the dimensional differences between the transistors 86 and 88, the differential amplifier 100 will receive definitely differentiated voltage values at its inputs, even when the charging voltage of capacitor 56, acting as the energy supply, is still very low. This means that the pulse detector 58, even at this stage, is able to output a defined recognition signal from its output 60, which can then be further processed by the other circuit units within the remote control unit 22 as soon as the charging voltage at the capacitor 56 has reached its full value, just as in the case of a functional battery 34.

The pulse detector 58 described therefore makes it possible to recognise and evaluate an interrogation signal received by the sensor 50, with or without a functionally operative battery 34.

What is claimed is:

1. A security system to enable authenticated access of an individual to a protected area comprising a remote control unit, carried by the individual, containing a transponder that on reception of an interrogation signal transmits an identification code group, and a control unit, located within the protected area which, when activated by the individual, transmits the interrogation signal and then checks the identification code group sent by the transponder, allowing access for the individual to the protected area only after positive verification of the authorisation to access, and wherein the transponder contained in the remote control unit is a passive transponder which obtains a supply voltage from the interrogation signal transmitted by the control unit and feeds this into a supply voltage rail, wherein the remote control unit contains a battery which, by means of a controllable battery coupling switch, can be connected to the supply voltage rail via a high-resistance path when the remote control unit is in a quiescent state, or via a low-resistance path when the remote control unit is in its operative state, wherein a pulse detector is provided which receives its supply voltage via the high-resistance path of the battery coupling switch when the remote control unit is in its quiescent state, which, on reception of the interrogation signal from the transponder, outputs a recognition signal, wherein a field-detector is provided which receives the signal and outputs a remote-field signal as soon as the recognition signal comes within a pre-determined range, wherein a logic circuit is provided which, on reception of the remote-field signal, outputs a switching signal to the battery coupling switch which switches this into the state where the battery is connected to the supply voltage rail via the low-resistance path, and outputs an activation signal to the transponder which will cause its transmitting unit to transmit the identification code group, and wherein a nearfield detector is provided which, on recognising a value of the supply voltage produced by the transponder exceeding a predetermined threshold value, outputs a nearfield signal that causes the logic circuit to put the battery coupling switch into the state prevailing in the quiescent state of the remote control unit and to transmit the activation signal to the transponder.

2. A security system according to claim 1, wherein the protected area is a vehicle whose door will only be unlocked by the control unit housed the vehicle when the identification code group sent back by the transponder corresponds to the code group expected by the control unit.

3. A security system according to claim 2, wherein the control unit housed in the vehicle transmits the interrogation signal when the individual either touches or actuates the door handle of the vehicle.

4. A security system according to claim 2 wherein an aerial, forming part of the vehicle control unit, is housed in the wing mirror on the driver's side.

5. A security system according to claim 1 wherein the pulse detector comprises a first and a second current mirror circuit, each consisting of two base-coupled transistors, which are interconnected so as to form an amplification circuit, whereby the collector of the first transistor of the first current mirror circuit is connected to the collector of the first transistor of the second current mirror circuit, and the collector of the second transistor of the first current mirror circuit is connected to the collector of the second transistor of the second current mirror circuit via a current source, whereby the transistors of the second current mirror circuit, for the purpose of providing definitely differentiated output voltages at identical collector currents at their respective collectors, have differently dimensioned base-emitter areas, so that the interrogation signal received from the transponder is applied to the emitter of the first transistor of the first current mirror circuit, and that a differential amplifier is provided which has inputs, one of which being connected to the interconnected collectors of the first transistors of both the current mirror circuits, and the other being connected to the collector of the second transistor of the second current mirror circuit, whereby the signal output from the output of the differential amplifier is the recognition signal.

6. A security system according to claim 5, wherein the differential amplifier is provided with negative feedback by way of two diodes and a resistor, to limit the dynamic range.

7. A security system according to claim 2 wherein the pulse detector comprises a first and a second current mirror circuit, each consisting of two base-coupled transistors, which are interconnected so as to form an amplification circuit, whereby the collector of the first transistor of the first current mirror circuit is connected to the collector of the first transistor of the second current mirror circuit, and the collector of the second transistor of the first current mirror circuit is connected to the collector of the second transistor of the second current mirror circuit via a current source, whereby the transistors of the second current mirror circuit, for the purpose of providing definitely differentiated output voltages at identical collector currents at their respective collectors, have differently dimensioned base-emitter areas, so that the interrogation signal received from the transponder is applied to the emitter of the first transistor of the first current mirror circuit, and that a differential amplifier is provided which has inputs, one of which being connected to the interconnected collectors of the first transistors of both the current mirror circuits, and the other being connected to the collector of the second transistor of the second current mirror circuit, whereby the signal output from the output of the differential amplifier is the recognition signal.

8. A security system according to claim 3 wherein the pulse detector comprises a first and a second current mirror circuit, each consisting of two base-coupled transistors, which are interconnected so as to form an amplification circuit, whereby the collector of the first transistor of the first current mirror circuit is connected to the collector of the first transistor of the second current mirror circuit, and the collector of the second transistor of the first current mirror circuit is connected to the collector of the second transistor of the second current mirror circuit via a current source, whereby the transistors of the second current mirror circuit, for the purpose of providing definitely differentiated output voltages at identical collector currents at their respective collectors, have differently dimensioned base-emitter areas, so that the interrogation signal received from the transponder is applied to the emitter of the first transistor of the first current mirror circuit, and that a differential amplifier is provided which has inputs, one of which being connected to the interconnected collectors of the first transistors of both the current mirror circuits, and the other being connected to the collector of the second transistor of the second current mirror circuit, whereby the signal output from the output of the differential amplifier is the recognition signal.

9. A security system according to claim 4 wherein the pulse detector comprises a first and a second current mirror circuit, each consisting of two base-coupled transistors, which are interconnected so as to form an amplification circuit, whereby the collector of the first transistor of the first current mirror circuit is connected to the collector of the first transistor of the second current mirror circuit, and the collector of the second transistor of the first current mirror circuit is connected to the collector of the second transistor of the second current mirror circuit via a current source, whereby the transistors of the second current mirror circuit, for the purpose of providing definitely differentiated output voltages at identical collector currents at their respective collectors, have differently dimensioned base-emitter areas, so that the interrogation signal received from the transponder is applied to the emitter of the first transistor of the first current mirror circuit, and that a differential amplifier is provided which has inputs, one of which being connected to the interconnected collectors of the first transistors of both the current mirror circuits, and the other being connected to the collector of the second transistor of the second current mirror circuit, whereby the signal output from the output of the differential amplifier is the recognition signal.

10. A security system to enable authenticated access of an individual to a protected area comprising:

- a remote control unit carried by the individual, the remote control unit containing passive transponder;
- a pulse detector coupled to a battery in the remote control unit by a high resistance path for receiving an interrogation signal transmitted by a control unit for the protected area, the pulse detector coupling a logic circuit to decode the interrogation signal and transmit an identification code to the battery by a low resistance path;
- a response circuit for the protected area that provides access to the individual on receipt of the identification code.

11. A remote control unit comprising:

a passive transponder;

a pulse detector coupled to a battery in the remote control unit by a high resistance path for receiving an interrogation signal;

the pulse detector coupling a logic circuit to decode the interrogation signal and to transmit identification code to the battery by a low resistance path.

* * * * *